(12) United States Patent  
Lin

(10) Patent No.: US 6,577,424 B1
(45) Date of Patent: Jun. 10, 2003

(54) CHROMATIC DISPERSION COMPENSATOR PROVIDING DISPERSION COMPENSATION TO SELECT CHANNELS OF A WAVELENGTH DIVISION MULTIPLEXED SIGNAL

(75) Inventor: Chinlon Lin, Holmdel, NJ (US)

(73) Assignee: Tyco Telecommunications (US) Inc., Morristown, NJ (US)

( * ) Notice: Subject to any disclaimer, the term of this patent is extended or adjusted under 35 U.S.C. 154(b) by 0 days.

(21) Appl. No.: 09/480,441

(22) Filed: Jan. 10, 2000

(51) Int. Cl.[7] .............................................. H04B 10/00
(52) U.S. Cl. .......................... 359/161; 359/130; 385/27
(58) Field of Search ................................. 359/161, 127, 359/130, 173; 385/27, 37, 123

(56) References Cited

U.S. PATENT DOCUMENTS 5,404,413 A * 4/1995 Delavaux et al. ........... 359/173
5,701,188 A * 12/1997 Shigematsu et al. ........ 359/130
6,154,588 A * 11/2000 Kai .............................. 359/161
6,157,477 A * 12/2000 Robinson .................... 359/130
6,373,609 B1 * 4/2002 Mizrahi ....................... 359/124

* cited by examiner

Primary Examiner—Kinfe-Michael Negash

(57) ABSTRACT

A dispersion compensator provides dispersion compensation to a WDM optical signal having a plurality of channels located at different wavelengths and traveling in an optical transmission path. The dispersion compensator includes an optical splitter adapted to receive the WDM optical signal. The optical splitter has first and second output ports such that a subset of the plurality of channels are directed along the first output port and remaining ones of the plurality of channels are directed along the second output port. A dispersion compensating element is coupled to the first output port and a multiplexing element having a first input port is coupled to second output port of the optical splitter. The multiplexing element also has a second input port coupled to the dispersion compensating element and an output port on which the subset of channels and the remaining ones of the channels are recombined.

30 Claims, 4 Drawing Sheets

CHROMATIC DISPERSION COMPENSATOR PROVIDING DISPERSION COMPENSATION TO SELECT CHANNELS OF A WAVELENGTH DIVISION MULTIPLEXED SIGNAL

FIELD OF THE INVENTION

The invention relates to the optical transmission of information and, more particularly, to a method and apparatus for compensating for chromatic dispersion that accrues over optical fiber transmission systems.

BACKGROUND OF THE INVENTION

The availability of high performance optical amplifiers such as the Erbium-Doped Fiber-Amplifier (EDFA) has renewed interest in the use of wavelength division multiplexing (WDM) for optical transmission systems. In a WDM transmission system, two or more optical data carrying channels are combined onto a common path for transmission to a remote receiver. Typically, in a long-haul optical fiber system, the set of wavelength channels would be amplified simultaneously in an optical amplifier based repeater. The Erbium-Doped Fiber-Amplifier is particularly useful for this purpose because of its ability to amplify multiple wavelength channels without crosstalk penalty.

Typically, it is advantageous to operate long-haul transmission systems at high data rates per channel. For example, useful data rates include multiples of the Synchronous Digital Hierarchy (SDH) standard, i.e., 2.5 and 10 Gb/s. As the bit rates increase through the gigabit per second range, the optical powers launched into the transmission fiber need to approach 1 mW per channel. As was demonstrated by Bergano et al. (European Conference on Optical Communications, Brussels, Belgium, paper Th.A.3.1, September 1995) the Non-Return-to-Zero (NRZ) transmission format is particularly useful for transmitting large amounts of data over optically amplified fiber paths. However, NRZ channels operating over long distances require sufficient control over the total amount of chromatic dispersion to ensure low dispersion penalties. Accordingly, the preferred transmission medium for such a system is dispersion shifted optical fibers.

Crosstalk, or the mixing of channels through the slight nonlinearity in the transmission fiber, may arise from the combination of long distance, low dispersion and high channel power. The transmission of many WDM channels over transoceanic distances may be limited by nonlinear interactions between channels, which in turn is affected by the amount of dispersion. This subject was reviewed by Tkach et al. (Journal of Lightwave Technology in Vol. 13, No. 5, May 1995 pp. 841–849). As discussed in Tkach et al., this problem may be overcome by a technique known as dispersion mapping, in which the generation of mixing products is reduced by offsetting the zero dispersion wavelength of the transmission fiber from the operating wavelengths of the transmitter. This technique employs a series of amplifier sections having dispersion shifted fiber spans with either positive or negative dispersion. The dispersion accumulates over multiple fiber spans of approximately 500 to 1000 km. The fiber spans of either positive or negative sign are followed by a dispersion-compensating fiber having dispersion of the opposite sign. This subsequent section of fiber is sufficient to reduce the average dispersion (averaged over the total length of the transmission system) substantially to zero. That is, a fiber of high negative (positive) dispersion permits compensation by a length of positive (negative) transmission fiber.

The efficacy of the dispersion mapping technique is limited because the amount of dispersion that occurs in a typical optical fiber depends on the operating wavelength that is employed. That is, only one given wavelength can operate at average zero dispersion. The wavelength dependence of the dispersion coefficient is sometimes referred to as the dispersion slope of the fiber. Accordingly, because of this characteristic of the dispersion slope, the various channels employed in a WDM system cannot all operate at the wavelength of average zero dispersion. This limitation can be overcome to a limited degree by using individual channel dispersion compensation at the receiver. However, since these systems are subject to nonlinear penalty, the ability to correct for the non-zero dispersion at the receiver terminal is limited.

One method and apparatus for managing dispersion in a WDM optical transmission system is shown in U.S. application Ser. No. 08/759,493. In this reference the usable optical bandwidth of the transmission system is divided into sub-bands that individually undergo dispersion compensation before being recombined. Accordingly, in comparison to other dispersion mapping techniques, more WDM data channels reside near a wavelength corresponding to the average zero dispersion wavelength. Unfortunately, this arrangement makes it difficult to upgrade the transmission system by adding more channels since the splitting/recombining elements that produce the sub-bands are designed for particular wavelengths and thus the channel wavelengths can only be changed by replacing the splitting/recombining elements.

Accordingly, there is a need for a dispersion compensator for an optical transmission system that allows the system to be upgraded by adding more channels.

SUMMARY OF THE INVENTION

In accordance with the method of the present invention, dispersion compensation is provided to a WDM optical signal having a plurality of channels located at different wavelengths and traveling in an optical transmission path. The method begins by selecting a subset of the plurality of channels that fall below a prescribed performance threshold when no dispersion compensation is performed. Next, dispersion compensation is provided to each of the subset of channels without compensating for dispersion in the remaining channels.

Since the present invention only provides dispersion compensation to a subset of channels, system upgrading can be conveniently performed in those wavebands corresponding to the remaining channels that do not undergo dispersion compensation.

In accordance with one aspect of the invention, the prescribed performance threshold is a Q-value for the optical transmission system. Since in some transmission systems the Q-value is relatively high over a wide bandwidth that encompasses all but the outermost channels, the selected subset of channels may be limited to the outermost channels. In such a case system upgrading can be performed over the wide bandwidth region that encompasses all but the outermost channels.

In accordance with another aspect of the invention, a dispersion compensator provides dispersion compensation to a WDM optical signal having a plurality of channels located at different wavelengths and traveling in an optical transmission path. The dispersion compensator includes an optical splitter adapted to receive the WDM optical signal. The optical splitter has first and second output ports such that a subset of the plurality of channels are directed along the first output port and remaining ones of the plurality of channels are directed along the second output port. A dispersion compensating element is coupled to the first output port and a multiplexing element having a first input port is coupled to second output port of the optical splitter. The multiplexing element also has a second input port coupled to the dispersion compensating element and an output port on which the subset of channels and the remaining ones of the channels are recombined.

In accordance with another aspect of the invention, the optical splitter includes an optical circulator. The optical splitter may also include at least one fiber Bragg grating coupled to a port of the circulator and reflecting thereto the subset of the plurality of channels that are to undergo dispersion compensation.

In accordance with yet another aspect of the invention, the multiplexing element is an optical circulator.

In accordance with another aspect of the invention, the optical splitter includes a wavelength routing device.

In accordance with another aspect of the invention, the dispersion compensator may be a single-mode optical fiber or a fiber Bragg grating.

DETAILED DESCRIPTION

Figure 1:
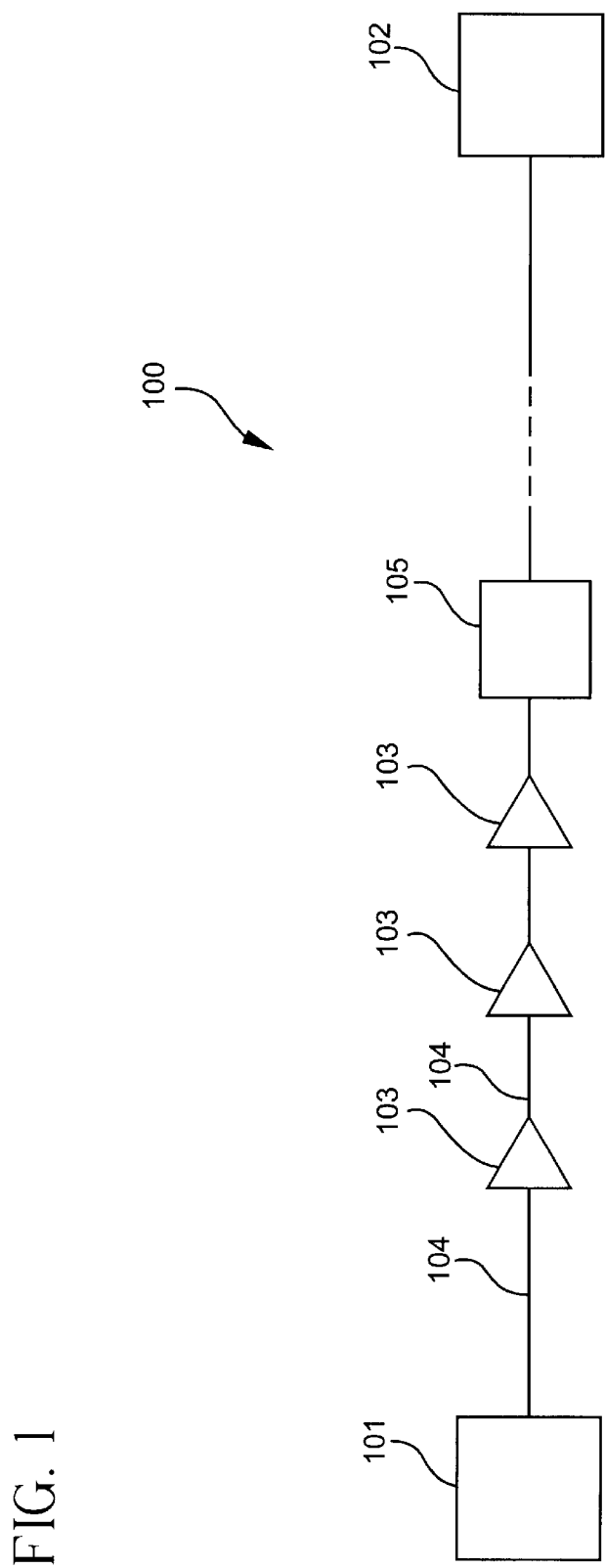
FIG. 1 shows a simplified block diagram of an optical fiber transmission system in which the present invention may be employed.

FIG. 1 shows a simplified block diagram of an exemplary optical fiber transmission system in accordance with the present invention. The system includes an optical transmission path 100, a transmitting terminal 101, and a receiving terminal 102. The transmitting terminal 101 provides an optical data signal that is to be transmitted to the remote receiving terminal via the optical fiber transmission path 100. The optical signal presented by the terminal 101 to the transmission path 100 may comprise a plurality of WDM optical carriers each carrying an SDH signal. FIG. 1 shows a single period of the dispersion map consisting of optical amplifiers 103, spans of transmission fiber 104, and dispersions compensator 105. In a typical long-haul system, this series of components constituting the dispersion map period might be repeated a number of times over the length of the system. The optical amplifiers 103 may be EDFAs, for example, which amplify optical signals in the 1550 nm wavelength band. In one embodiment of the invention the transmission fibers 104 may be dispersion-shifted single-mode fibers with an average zero dispersion wavelength higher than the operating wavelengths of the system. For example, the transmission fibers 104 may be similar to those used in Bergano et al. (European Conference on Optical Communications, Brussels, Belgium, paper Th.A.3.1, September 1995), in which the transmission fiber had an average zero dispersion wavelength of 1580 nm and a dispersion slope of about 0.073 ps/km-nm².

A simple linearized chromatic dispersion relationship between the signal wavelength $\lambda_{sig}$ and the dispersion D is given in equation 1:

$$D = SL(\lambda_{sig} - \lambda_0) \qquad (1)$$

where the dispersion D is measured in units of ps/nm, the dispersion slope S is measured in units of ps/km-nm², and the average zero dispersion wavelength $\lambda_0$ of the transmission fiber is measured in units of nm. As equation 1 clearly indicates, the point of minimum dispersion only occurs at one particular wavelength $\lambda_0$. Accordingly, as disclosed in. U.S. Pat. No. 5,559,920, if a set of WDM channels were transmitted along the transmission path 100, a dispersion compensating fiber could only translate one channel back to the zero dispersion wavelength. The remaining channels would accumulate dispersion. As previously noted, this problem can be alleviated by dividing the system bandwidth into sub-bands that individually undergo dispersion compensation before being re-combined. The sub-bands may constitute individual channels or a group of channels. As a result, more WDM data channels reside near a wavelength corresponding to the average zero dispersion wavelength. One problem with this technique is that it is difficult to upgrade the transmission system by adding more channels since the splitting/recombining elements that produce the sub-bands are designed for particular wavelengths and thus the channel wavelengths can only be changed by replacing the splitting/recombining elements.

Figure 2:
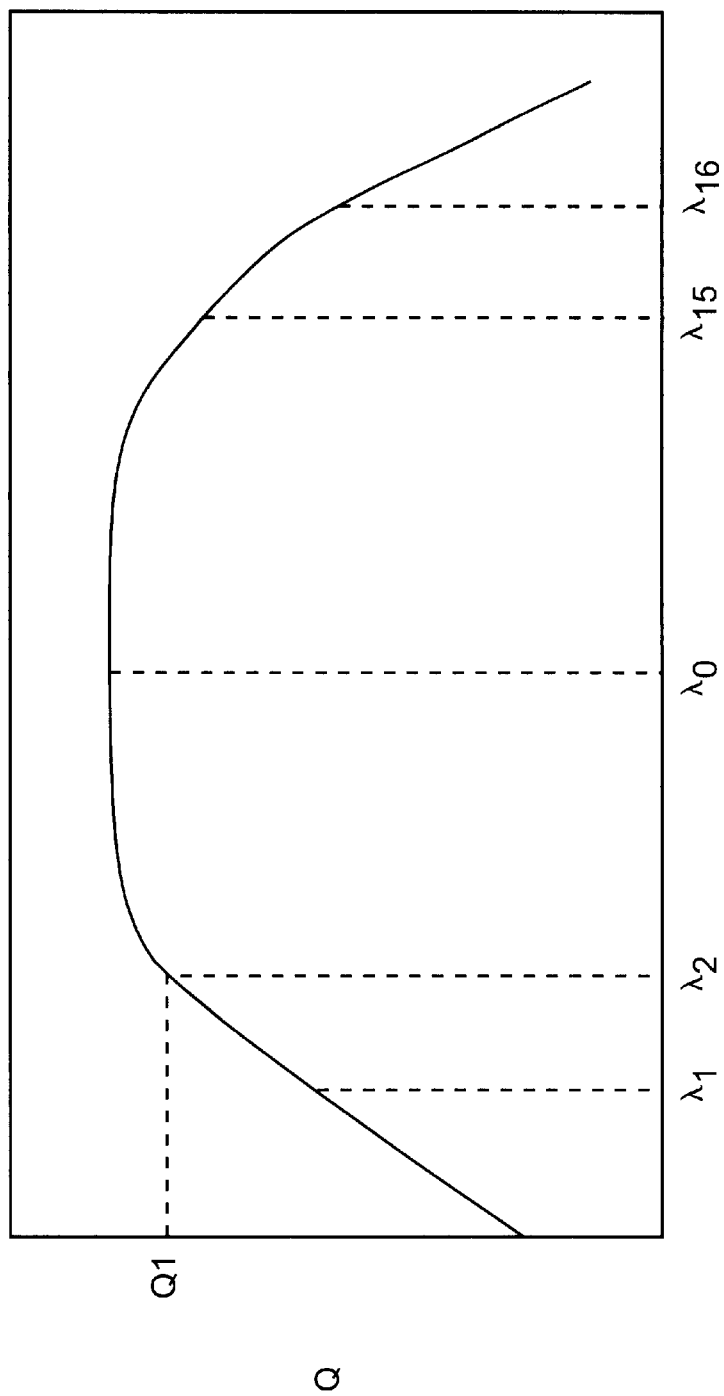
FIG. 2 shows a graph of the Q-value as a function of wavelength for an optical transmission system in which $\lambda_0$ is the zero dispersion wavelength.

The present inventor has recognized that in many circumstances it is not necessary to provide dispersion compensation to each and every sub-band or channel. This conclusion can be understood with reference to FIG. 2, which shows the Q-value (or equivalently, the bit error rate) as a function of wavelength or channel number over the system bandwidth when complete dispersion compensation is only provided at the single wavelength $\lambda_0$. As is well known to those of ordinary skill in the art, the Q-value is a measure of transmission performance that is equivalent to a signal-to-noise measured at the electrical decision threshold point in the receiving terminal. Since complete dispersion compensation is only achieved at $\lambda_0$, the Q-value falls off for those wavelengths increasingly remote from $\lambda_0$ as a result of the signal penalty arising from accumulated dispersion. Only when the Q-value falls below some threshold value (e.g., Q1 in FIG. 2) is the system impairment sufficiently great to warrant the provision of dispersion compensation. For example, if in FIG. 2 channel $\lambda_8$ is the zero dispersion wavelength and the Q-value of channels $\lambda_3$–$\lambda_{14}$ remain above the desired threshold Q1, then in accordance with the present invention, it only becomes necessary to provide dispersion compensation to wavelengths $\lambda_1$–$\lambda_2$ and $\lambda_{15}$–$\lambda_{16}$. Since dispersion compensation need not be provided to the waveband encompassed by channels $\lambda_3$–$\lambda_{14}$, additional channels can be inserted in this waveband when an upgrade to the system is required.

Figure 3:
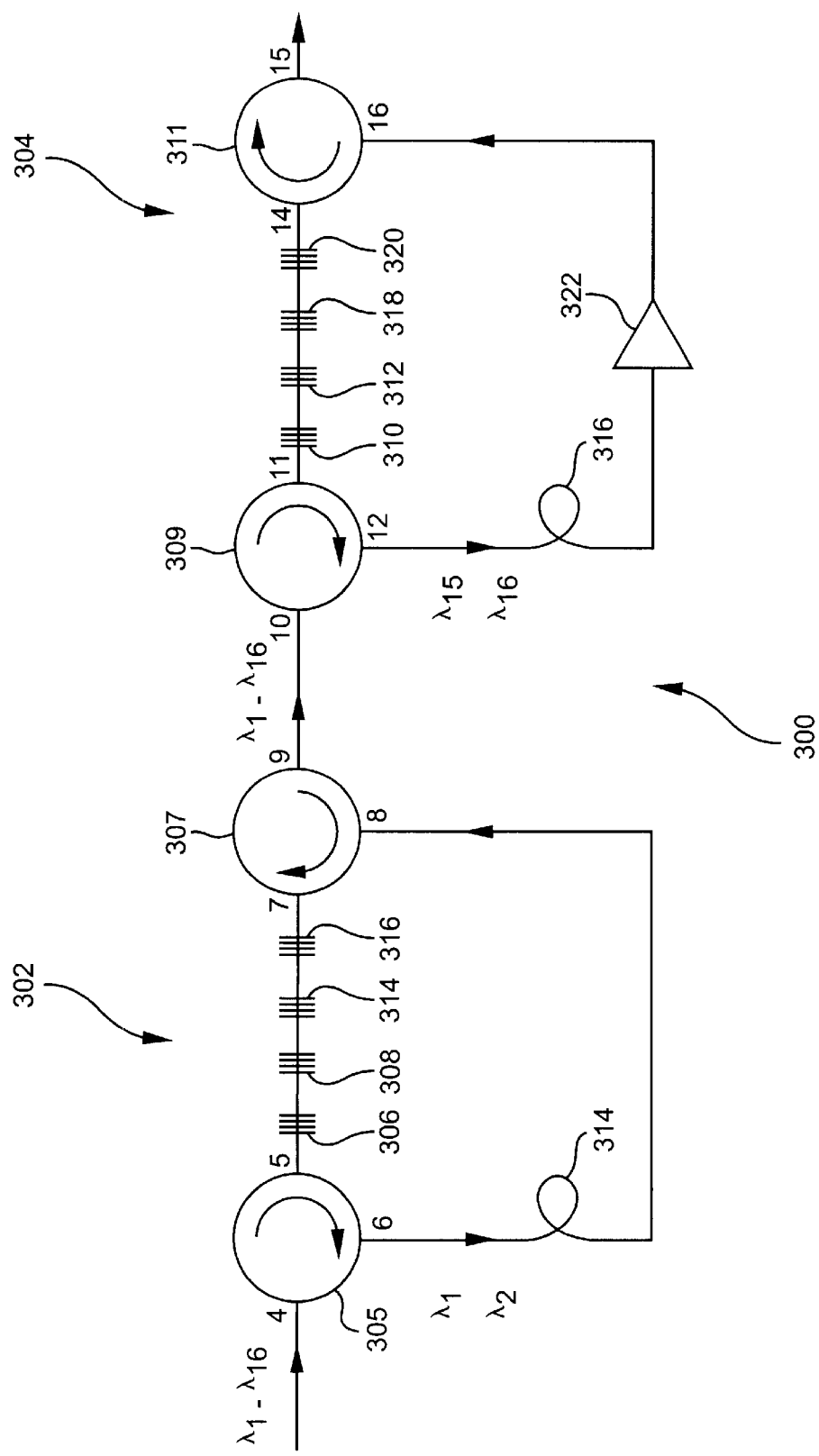
FIG. 3 shows one embodiment of the dispersion compensator constructed in accordance with the present invention.

FIG. 3 shows one embodiment of a chromatic dispersion compensator 300 constructed in accordance with the present invention, which compensates for the dispersion of channels $\lambda_1$–$\lambda_2$ and $\lambda_{15}$–$\lambda_{16}$ in a WDM optical signal. Dispersion compensator 300 includes a first dispersion compensating stage 302, which compensates for dispersion in channels $\lambda_1$ and $\lambda_2$, and dispersion compensating stage 304, which compensates for dispersion in channels $\lambda_{15}$ and $\lambda_{16}$. Dispersion compensating stage 302 includes first and second optical circulators 305 and 307. The circulator 305 has ports 4, 5, and 6 in which port 5 is located downstream from port 4 and port 6 is located downstream from port 5. That is, optical energy is transported through the circulator 305 in a clockwise direction. Similarly, circulator 307 has ports 7, 8, and 9 in which port 8 is located downstream from port 7 and port 9 is located downstream from port 8. That is, optical energy is transported through the circulator 307 in a counterclockwise direction In operation, the WDM channels $\lambda_1$–$\lambda_{16}$ enter port 4 of circulator 305. The WDM channels $\lambda_1$–$\lambda_{16}$ exit the circulator 305 on port 5 of circulator 305 and enter first and second fiber reflection gratings 306 and 308 that are configured to reflect channels $\lambda_1$ and $\lambda_2$, respectively, while transmitting the remaining channels. Channels $\lambda_1$ and $\lambda_2$ reenter port 5 of circulator 305 after being reflected by fiber Bragg gratings 306 and 308 and subsequently exit port 6 of circulator 305. Channels $\lambda_1$ and $\lambda_2$ then enter a dispersion compensating element 314, which may be, for example, a dispersion compensating fiber or a dispersion compensating grating. Channels $\lambda_1$ and $\lambda_2$ are then directed to port 8 of circulator 307 while the remaining wavelengths that are transmitted through gratings 306, 308, 314, and 316 e.g., $\lambda_3$–$\lambda_{16}$, are directed to port 7 of circulator 307. Channels $\lambda_1$–$\lambda_2$ are directed to port 7 and are reflected from fiber Bragg gratings 314 and 316, which, like fiber Bragg gratings 306 and 308, are configured to reflect channels $\lambda_1$–$\lambda_2$. Finally, channels $\lambda_1$–$\lambda_2$ and $\lambda_3$–$\lambda_{16}$ are recombined in circulator 307 so the complete WDM signal exits on port 9 of circulator 307.

Dispersion compensating stage 304 operates similar to dispersion compensating stage 302. That is, WDM channels $\lambda_1$–$\lambda_{16}$ enter port 10 of circulator 309. The WDM channels $\lambda_1$–$\lambda_{16}$ exit the circulator 309 on port 11 of circulator 309 and enter first and second fiber reflection gratings 310 and 312 that are configured to reflect channels $\lambda_{15}$ and $\lambda_{16}$, respectively, while transmitting the remaining channels. Channels $\lambda_{15}$ and $\lambda_{16}$ reenter port 11 of circulator 309 after being reflected by fiber Bragg gratings 310 and 312 and subsequently exit port 12 of circulator 309. Channels $\lambda_{15}$ and $\lambda_{16}$ then enter dispersion compensating element 316, which may be, for example, a dispersion compensating fiber or a dispersion compensating grating. Channels $\lambda_{15}$ and $\lambda_{16}$ are then directed to port 16 of circulator 311 while the remaining wavelengths that are transmitted through gratings 310, 312, 318, and 320 e.g., $\lambda_1$–$\lambda_{14}$, are directed to port 14 of circulator 311. Channels $\lambda_{15}$–$\lambda_{16}$ are directed to port 16 and are reflected from fiber Bragg gratings 318 and 320, which, like fiber Bragg gratings 310 and 312, are configured to reflect channels $\lambda_{15}$–$\lambda_{16}$. Finally, channels $\lambda_1$–$\lambda_{14}$ and $\lambda_{15}$–$\lambda_{16}$ are recombined in circulator 311 so that the complete WDM signal exits on port 15 of circulator 311. Dispersion compensator 300 has thus overall provided dispersion compensation to channels $\lambda_1$, $\lambda_2$, $\lambda_{15}$, and $\lambda_{16}$ of the WDM signal.

Figure 4:
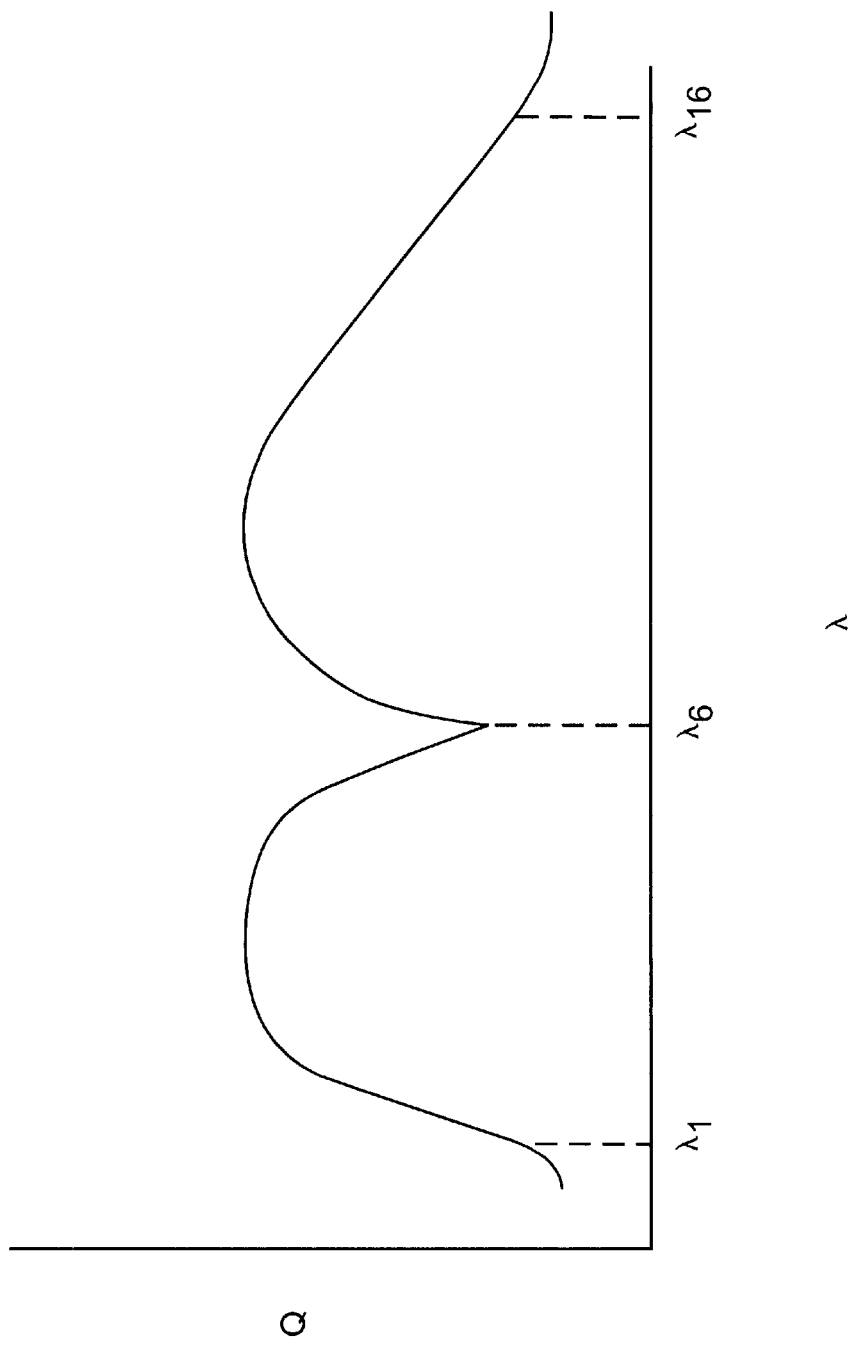
FIG. 4 shows an arbitrary Q-value as a function of wavelength for an optical transmission system.

It should be noted that while the embodiment of the invention shown in FIG. 3 provides dispersion compensation to channels $\lambda_1$–$\lambda_2$ and $\lambda_{15}$–$\lambda_{16}$, the invention more generally may provide dispersion compensation to any subset of the channels that form the WDM optical signal. For example, dispersion compensation may be provided to channels other than the edge channels $\lambda_1$–$\lambda_2$ and $\lambda_{15}$–$\lambda_{16}$. FIG. 4 shows an arbitrary example of the Q-value as function of wavelength in which, due to the dispersion slope of the transmission path, Q falls below its desired value at channels $\lambda_1$, $\lambda_6$, and $\lambda_{16}$. Accordingly, in this example, the inventive dispersion compensator would provide dispersion compensation to channels $\lambda_1$, $\lambda_6$, and $\lambda_{16}$. In such a case, the dispersion compensator may have up to three stages so that a different amount of dispersion compensation can be imparted to each channel. Of course, if the amount of dispersion compensation required for any two or more channels is about the same, these channels can undergo dispersion compensation in the same stage. That is, the maximum number stages that is required will be less than or equal to the number of channels undergoing dispersion compensation.

The embodiment of the invention shown in FIG. 3 employs an unchirped fiber Bragg grating for each channel that is to undergo dispersion compensation. More generally, however, the fiber Bragg gratings that are employed may be linearly chirped gratings that reflect the channel or channels that are to undergo dispersion compensation. Accordingly, the number of distinct fiber Bragg gratings that are employed may be less than the total number of channels being reflected.

In some embodiments of the invention, one or more the dispersion compensating stages may employ an optical amplifier located downstream from the dispersion compensating element. For example, in FIG. 3, dispersion compensating stage 304 includes optical amplifier 322. The optical amplifier is employed to overcome any excessive loss that the channels may experience in the dispersion compensating element.

In some optical transmission systems the channel spacing may be very small. That is, the system may have a very high channel density. In such systems it may be difficult to separate out the individual channels that are to undergo dispersion compensation. For example, a 64 channel system having a 50 GHz channel spacing (corresponding to about 0.4 nm in the 1550 spectral region) cannot employ readily available components to separate out individual wavelengths. In these cases the dispersion compensator may be preceded with an interleaver/deinterleaver so that the channel spacing can be increased. For example, the previously mentioned 64 channels could be converted by a deinterleaver into two 32 channels signals in which the channel spacing in each signal is 100 GHz per channel instead of the original 50 GHz per channel. Each signal then undergoes dispersion compensation with its own dispersion compensator of the type shown in FIG. 3. Once the dispersion compensation process is completed, the two signals are directed to an interleaver in which they are remultiplexed to produce the original 64 channel signal with a 50 GHz channel spacing.

In the previously described embodiments of the invention it was assumed that the transmissions fiber had a negative dispersion and that the dispersion compensator had a positive dispersion. Of course, those skilled in the art will recognize that the invention alternatively could operate in connection with a transmission fiber having a positive dispersion and a dispersion compensator that has negative dispersion.

Although various embodiments are specifically illustrated and described herein, it will be appreciated that modifications and variations of the present invention are covered by the above teachings and within the purview of the appended claims without departing from the spirit and intended scope of the invention. For example, while the embodiment of the invention shown in FIG. 3 employs circulators that serve as add-drop multiplexers that split and recombine the signal, one of ordinary skill in the art will recognize that many other elements such as wavelength routing devices may be alternatively employed.

What is claimed is:

1. A method of providing dispersion compensation to a WDM optical signal having a plurality of channels located at different wavelengths and traveling in an optical transmission path, said method comprising the steps of:

selecting a subset of the plurality of channels that fall below a prescribed performance threshold when no dispersion compensation is performed; and compensating for dispersion in each of said subset of channels without compensating for dispersion in the remaining channels.

2. The method of claim 1 wherein the dispersion compensation step is accomplished with single-mode optical fibers.

3. The method of claim 1 wherein the dispersion compensation step is accomplished with a fiber Bragg grating.

4. The method of claim 3 wherein said fiber Bragg grating is a chirped grating.

5. The method of claim 1 further comprising the step of amplifying the subset of channels after performing the dispersion compensation step.

6. The method of claim 5 wherein said amplifying step is performed by an optical amplifier.

7. The method of claim 1 wherein said prescribed performance threshold is a Q-value for the optical transmission path.

8. The method of claim 1 wherein the step of selecting said subset of channels includes the step of selecting a subset of said channels that are most remote from a channel located at a zero dispersion wavelength.

9. The method of claim 1 wherein the step of selecting said subset of channels includes the step of splitting said subset of channels from remaining ones of the plurality of channels.

10. The method of claim 9 further comprising the step of recombining said subset of channels with said remaining ones of the channels after performing the dispersion compensating step.

11. The method of claim 9 wherein the splitting step is performed by an optical circulator and a fiber Bragg grating.

12. The method of claim 10 wherein the recombining step is performed by an optical circulator and a fiber Bragg grating.

13. A dispersion compensator for providing dispersion compensation to a WDM optical signal having a plurality of channels located at different wavelengths and traveling in an optical transmission path, said dispersion compensator comprising:

an optical splitter adapted to receive the WDM optical signal and having first and second output ports such that a subset of the plurality of channels are directed along the first output port and remaining ones of the plurality of channels are directed along the second output port;

a dispersion compensating element coupled to the first output port; and a multiplexing element having a first input port coupled to second output port of the optical splitter, a second input port coupled to the dispersion compensating element, and an output port on which the subset of channels and the remaining ones of the channels are recombined.

14. The dispersion compensator of claim 13 wherein said optical splitter includes an optical circulator.

15. The dispersion compensator of claim 14 wherein said optical splitter further includes at least one fiber Bragg grating coupled to a port of the circulator and reflecting thereto the subset of the plurality of channels.

16. The dispersion compensator of claim 14 wherein said multiplexing element includes a second optical circulator.

17. The dispersion compensator of claim 13 wherein said optical splitter includes a wavelength routing device.

18. The dispersion compensator of claim 13, wherein said subset of channels fall below a prescribed performance threshold when no dispersion compensation is performed.

19. The dispersion compensator of claim 13, wherein said subset of channels are selected from among those channels that are most remote from a channel located at a zero dispersion wavelength.

20. The dispersion compensator of claim 16 wherein said multiplexing element further includes at least one fiber Bragg grating coupled to said second optical circulator for reflecting the subset of the plurality of channels.

21. The dispersion compensator of claim 13 wherein said dispersion compensating element is a single-mode optical fiber.

22. The dispersion compensator of claim 13 wherein said dispersion compensating element is a fiber Bragg grating.

23. A dispersion compensator for providing dispersion compensation to a WDM optical signal having a plurality of channels located at different wavelengths and traveling in an optical transmission path, said dispersion compensator comprising:

first and second optical circulators each having first, second, and third ports such that port 2 is located in a downstream direction from the first port, and the third port is located in a downstream direction from the second port, said second port of the first circulator being coupled to said first port of the second optical circulator;

a dispersion compensating element coupling the third port of the first circulator to the third port of the second circulator, said dispersion compensating element providing dispersion compensation to a subset of the plurality of channels; and at least one fiber Bragg grating coupling the second port of the first circulator to the first port of the second circulator, said fiber Bragg grating reflecting said subset of the plurality of channels.

24. The dispersion compensator of claim 23 wherein said subset of channels fall below a prescribed performance threshold when no dispersion compensation is performed.

25. The dispersion compensator of claim 23 wherein said subset of channels are selected from among those channels that are most remote from a channel located at a zero dispersion wavelength.

26. The dispersion compensator of claim 24 wherein said subset of channels are selected from among those channels that are most remote from a channel located at a zero dispersion wavelength.

27. The dispersion compensator of claim 23 further comprising a deinterleaver coupled to the first port of the first optical circulator.

28. The dispersion compensator of claim 27 further comprising an interleaver coupled to the second port of the second optical circulator.

29. The dispersion compensator of claim 23 wherein said dispersion compensating element is a single-mode optical fiber.

30. The dispersion compensator of claim 23 wherein said dispersion compensating element is a fiber Bragg grating.

* * * * *